United States Patent [19]

Katoh et al.

[11] 4,327,149

[45] Apr. 27, 1982

[54] EXTRUDED RIGID THERMOPLASTIC SHEET HAVING OPTICALLY SMOOTH SURFACES

[75] Inventors: Tsuneyuki Katoh; Keishiro Hiraga, both of Yokohama; Junji Seki, Tokyo; Makoto Suzuki, Kamakura, all of Japan

[73] Assignee: Asahi Kasei Kogyo Kabushiki Kaisha, Japan

[21] Appl. No.: 160,494

[22] Filed: Jun. 18, 1980

Related U.S. Application Data

[63] Continuation of Ser. No. 2,253, Jan. 10, 1979, Pat. No. 4,247,507.

[51] Int. Cl.³ .................... B32B 27/16; B32B 27/30; G02C 7/02; G02F 1/29
[52] U.S. Cl. .................... 428/332; 264/1.1; 264/210.2; 264/284; 350/359; 351/177; 428/337; 428/339; 428/409
[58] Field of Search ............... 428/410, 332, 337, 339, 428/409; 350/359; 351/177; 264/1, 284, 210.2, 1.1

[56] References Cited

U.S. PATENT DOCUMENTS 3,937,863  2/1976  Moore .......................... 428/410

FOREIGN PATENT DOCUMENTS 1198911  7/1970  United Kingdom .

OTHER PUBLICATIONS

Breuer, Plastverarbeiter, No. 3, pp. 113-122, Jan. 1978.
ASTM D-648, Standard Method of Test for Deflection Temperature of Plastics Under Load, pp. 202-204.

*Primary Examiner*—Thomas J. Herbert, Jr.

[57] ABSTRACT

An extruded rigid thermoplastic sheet having optically smooth surfaces, characterized as exhibiting a degree of optical distortion ($\delta$) of from 0.03 to 0.06, is produced by a process wherein a sheet-form extrudate from an extruder is polished by polishing rolls driven via a continuous driving force transmission.

4 Claims, 8 Drawing Figures

EXTRUDED RIGID THERMOPLASTIC SHEET HAVING OPTICALLY SMOOTH SURFACES

This is a continuation of application Ser. No. 2,253, filed Jan. 10, 1979, which application is now U.S. Pat. No. 4,247,507.

This invention relates to a novel extruded rigid thermoplastic sheet having good surface characteristics. More particularly, it relates to an extruded rigid thermoplastic sheet having optically smooth surfaces characterized as exhibiting a reduced optical distortion, which sheet is produced by extruding a thermoplastic material under strictly controlled conditions.

Rigid thermoplastic materials, such as a methyl methacrylate polymer, polycarbonate, polystyrene and rigid polyvinyl chloride have many applications in view of their good optical characteristics, such as transparency and attractive appearance, light resistance and shaping characteristics. These rigid thermoplastic materials are shaped into various molded articles, for example, by an injection molding technique. The rigid thermoplastic materials are also shaped into sheets or plates of from 1 to 10 mm in thickness, and then, the sheets or plates are subjected to fabricating, such as bending, pressing, vacuum forming, compression molding and adhesive-assembling. The fabricated sheets or plates may be printed, painted or otherwise finished into final articles, such as signboards, displays, and covers for room lights.

The above-mentioned sheets or plates can be produced by various procedures. For example, methyl methacrylate polymer sheets or plates are usually produced by cell-casting, continuous casting or extrusion procedures. The cell-casting procedure involves casting a methyl methacrylate monomer in a molding space defined by a pair of confronting glass plates and by a peripherally disposed gasket, in which space the monomer is polymerized. The cell-casting procedure is poor in operating efficiency, and therefore, employed only for restricted applications. The continuous casting procedure involves pouring a methyl methacrylate monomer into the upstream end of a molding space defined by a pair of continuously moving confronting endless belts and by a pair of continuously moving gaskets, in which space the monomer is polymerized, and withdrawing the resulting sheet from the downstream end of the molding space. The continuous casting procedure exhibits a greatly enhanced operating efficiency, as compared with the above-mentioned cell-casting procedure, and therefore, is most popularly employed for the production of methyl methacrylate polymer sheets. However, the continuous casting procedure involves one continuous operation requiring large scale production equipment, and therefore, is not suitable for the production of sheets of different dimensions in small lots. Furthermore, the production cost is high, ranking second to the cell-casting procedure.

The extrusion procedure involves melt-extruding methyl methacrylate polymer particles in a bead, pellet or granule form through a T-die of an extruder, maintained for example at from 200° to 350° C., and then polishing the extruded sheet by polishing rolls. The polymer bead, pellet or granule used is prepared either by polymerizing the monomer by emulsion or suspension polymerization, or by polymerizing the monomer by bulk polymerization, followed by pulverizing or melt-pelleting the polymerization product. The extrusion procedure is suitable for the production of sheets of multiple dimensions in small lots. The methyl methacrylate polymer sheets so produced are less costly to produce and possess better thermo-forming properties than the sheets produced by the cell-casting or continous casting procedure. However, the sheet produced by an extrusion procedure (which sheet is hereinafter referred to as an "extruded sheet" for brevity) generally exhibits nonuniformity in some properties along the axis in the extrusion direction or the direction perpendicular thereto. Among others, an extruded sheet exhibits nonuniformity in optical surface smoothness, i.e., has on the surfaces parallel stripes at approximately regular intervals, each stripe extending in the direction perpendicular to the extrusion direction. Thus, when a certain object is viewed through the extruded sheet or by its reflection on the extruded sheet, the viewed image of the object is warped, i.e., the straight ridges of the object appear to be somewhat wavy. Although such defect of the optical surface smoothness is observed even in the continuously cast sheet, this defect is almost negligible as compared with that observed in the extruded sheet. Accordingly, a definite requirement must be satisfied in order to produce an extruded methyl methacrylate polymer sheet having improved optically smooth surfaces, compared with those of a cell-cast or continuously cast methyl methacrylate polymer sheet. This is also true for other rigid thermoplastic sheet materials such as polystyrene and polycarbonate.

A main object of the present invention is to provide an extruded rigid thermoplastic sheet having improved optically smooth surfaces.

Other objects and advantages of the present invention will be apparent from the following description.

In accordance with the present invention, there is provided an extruded rigid thermoplastic sheet having optically smooth surfaces characterized as exhibiting a degree of optical distortion ($\delta$) of from 0.03 to 0.06.

By the term "rigid thermoplastic sheet" used herein, we mean a sheet made of a thermoplastic material which possesses a heat distortion temperature of at least 70° C., as measured according to ASTM D-648 at a fiber stress of 18.5 kgf/cm$^2$, and which is originally transparent. Such thermoplastic material includes, for example, a methyl methacrylate polymer, polycarbonate, polystyrene and polyvinyl chloride. These polymers may be either homopolymer or copolymer.

The term "degree of optical distortion ($\delta$)" used herein, is a measure for quantitatively evaluating the above-mentioned distortions represented by the parallel stripes of approximately regular intervals, extending in the direction perpendicular to the extrusion direction, which stripes are observed on the surfaces of an extruded rigid thermoplastic sheet. The degree of optical distortion ($\delta$) is determined as follows.

The apparatus assembly used comprises a slide projector (supplied by RIKAGAKU KIKAI CO.) provided with a projector lamp K-P12-750W; a plate having a slit of 1.5 mm in width placed 33 centimeters from the projector lamp; a support for rigidly supporting a sheet specimen at a distance of 200 centimeters from the slit of the plate; a white plastic screen placed 300 centimeters from the sheet specimen; and a camera for taking a photograph of the projected image visible on the screen, which camera is placed beside the sheet specimen. The apparatus assembly is installed in a dark room.

Figure 1:
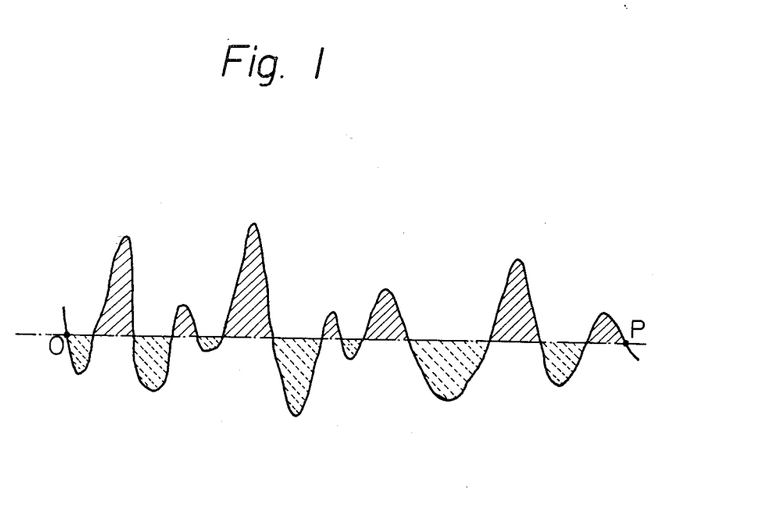

The camera used is NIKON F, with a lens set of F 1.4, supplied by Nippon Kogaku K.K. The photographic film used is a Mini-copy II of ASA 32 supplied by Fuji Photo Film Co., Ltd. The exposure conditions are F/2.0 and 1.0 second. The developing of the exposed photographic film is carried out at a temperature of 20° C. for a period of five minutes by using a developer named COPINAL. The luminous transmittance T, as defined by the following formula, of the developed image is scanned by using a densitometer (SAKURA PDM-5 type micro-densitometer supplied by Konishiroki Photographic Co.), and recorded as the absorbance D, as defined by the following formula.

$$T = (I/Io) \times 100$$

$$D = -\log T$$

Where Io = intensity of incident light and I = intensity of transmitted light. The recorded absorbance is expressed as a wavy line as diagrammatically shown, for example, in FIG. 1. As shown in FIG. 1, two points O and P are suitably marked on the wavy line so that, when a straight base line is drawn between the two points O and P, the total upper area hatched with solid lines and the total lower area hatched with dotted lines are equal to each other.

The degree of optical distortion ($\delta$) is calculated from the following equation.

$$\delta = S/L \text{ (unit: absorbance)}$$

where S is the sum of the total upper area and the total lower area (unit: absorbance × centimeter) and L is the distance between the two points O and P (unit: centimeter). The degree of optical distortion ($\delta$) can be determined with a higher accuracy by setting a plurality of, for example, ten distances ($L_1, L_2, \ldots L_{10}$) and calculating the average value of ten $\delta$'s ($\delta_1, \delta_2, \ldots \delta_{10}$).

For the purpose of clarification, examples of the degree of optical distortion ($\delta$) are set forth below. The determination of the degree of optical distortion was made on the following three sheet specimens A, B and C.

A: a cell cast methyl methacrylate polymer sheet exhibiting excellent surface smoothness.
B: an extruded methyl methacrylate polymer sheet of the present invention.
C: a conventional extruded methyl methacrylate polymer sheet.

Figure 2A:
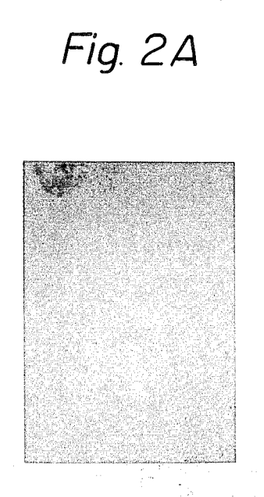
Figure 2B:
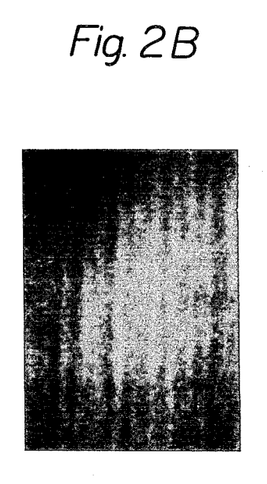
Figure 2C:
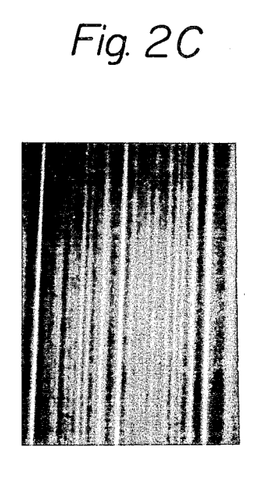
Figure 3:
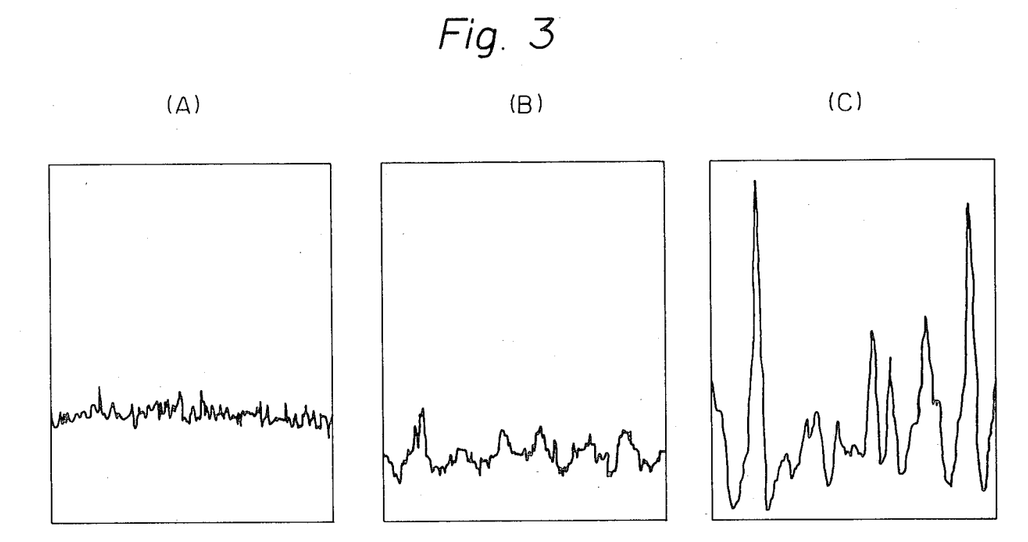

The photographs taken of the three sheet specimens A, B and C had the patterns indicated in FIG. 2. These photographs were scanned by the micro-densitometer to obtain the results shown in FIG. 3, in which case the full scale of the densitometer was set at a D of from 0 to 2. From the results shown in FIG. 3, the degree of optical distortions were calculated thereby to obtain 0.025 for A, 0.03 for B and 0.16 for C.

Similarly, the degree of optical distortions ($\delta$) was determined on commercially available methyl methacrylate polymer sheet specimens supplied by three Japanese companies a, b and c, and those supplied by four companies of nationalities other than Japan, d, e, f and g. The results are shown in Table I, below.

TABLE I

| Specimens supplied by | Sheet thickness (mm) | δ |
|---|---|---|
| a | 3 | 0.14 |
| a | 5 | 0.08 |
| b | 2 | 0.10 |
| b | 5 | 0.09 |

TABLE I-continued

| Specimens supplied by | Sheet thickness (mm) | δ |
|---|---|---|
| c | 2 | 0.16 |
| c | 5 | 0.12 |
| d | 3 | 0.18 |
| e | 2 | 0.17 |
| f | 3 | 0.14 |
| g | 3 | 0.10 |

As is apparent from the photographs shown in FIG. 2 and the degree of optical distortions shown above, the extruded sheet of the present invention exhibits an enhanced optical surface smoothness as compared with conventional extruded sheets.

The difference in optical surface smoothness between the extruded sheet of the present invention and the conventional extruded sheets depends mainly upon the mechanism by which a driving force is finally transmitted to the polishing rolls used for polishing an extruded sheet. Conventionally, a chain or gear drive is employed for the driving force transmission to the polishing rolls. The polishing rolls driven by a conventional chain or gear drive exhibit an intermittent change in the speed of rotation at a frequency of the order of 1 cycle/sec according to the pitch of the chain or gear. Such an intermittent change in the speed of rotation of the polishing rolls causes fluctuation in the compression force exerted upon the thermoplastic material in a thermally softened state which is sandwiched between the polishing rolls. This compression force fluctuation leads to nonuniformity in the thickness of the polished thermoplastic sheet. In order to avoid or minimize the intermittent change in the speed of rotation of the polishing rolls, it has heretofore been proposed to employ a chain transmission with a smaller unit length or a silent chain transmission. However, these proposals are not completely satisfactory for the desired optical surface smoothness.

The desired optical surface smoothness observed in the extruded sheet of the present invention is obtained by the continuous driving force transmission to the polishing rolls, contrary to the above-mentioned conventional intermittent driving force transmission. By the term "continuous driving force transmission" used herein, is meant that the driving force is transmitted extremely smoothly without any discernible fluctuation. Such continuous driving force transmission may be achieved, for example, by an indirect driving force transmission system, by which a plurality of polishing rolls are driven by a single motor, such as fluid contact transmission, flat belt type transmission, roller contact transmission and cone contact transmission. In such an indirect driving force transmission system, a driving force is transmitted from a single motor via a plurality of reduction gears to the polishing rolls. The final transmission unit is crucial for the smooth transmission of no discernible fluctuation. The reduction and transmission units located upstream of the final transmission unit are not critical and may be of a gear structure exhibiting an intermittent driving force transmission. By the term "fluid contact transmission", used herein, is meant the transmission achieved generally by a fluid coupling or a hydraulic torque converter. The hydraulic torque converter is recently popularly employed in automatic transmissions of automobiles. Such converter is referred to, for example, in the Manual of Mechanical Engineering, edited by the Japan Society of Mechanical Engineers, as an item called "torque converter". Such torque converter is equipped for each transmission to each polishing roll. By the term "flat belt type transmission", used herein, is meant the transmission wherein a driving force is transmitted from a power transmission shaft via flat belts and pulleys to the polishing rolls. By the terms "roller contact transmission" and "cone contact transmission", used herein, are meant transmissions which have a mechanism such that a driving force is transmitted from a small diameter roller or cone rotating at a relatively high speed to a large diameter roller or cone contacted with the small diameter roller or cone. The rollers and cones are usually made of metal and are covered with rubber on their exterior surfaces. The above-mentioned indirect driving force transmission systems may be employed either alone or in combination.

The continuous driving force transmission may also be achieved either by a direct driving force transmission system utilizing a direct driving motor or a driving force transmission system utilizing a direct driving motor provided with a reduction mechanism having a high accuracy. In the latter driving force transmission system, each polishing roll is driven by the corresponding single motor, and therefore, the mechanical arrangement of the transmission system can be made with very high accuracy. Thus, for example, even a transmission system using gears brings about better results than a conventional indirect transmission system using worm gears.

The driving force transmission should preferably be carried out as smoothly as possible for the intended optical surface smoothness. This can be achieved by a team of engineers skilled in designing, manufacturing and assembling driving force transmission systems. The precision of the driving force transmission system can be evaluated by measuring the amount of low frequency fluctuation of the polishing rolls by using an electric micrometer as described below.

Before going into the explanation of the determination of the fluctuation of polishing rolls, a gear transmission mechanism will be illustrated briefly. For example, when a worm gear is used, a stress is transmitted from a worm to the next worm gear. This stress is divided into a stress vector effective for rotating the worm gear and a stress vector operating in the direction perpendicular to the former stress vector and therefore is not effective for rotating the worm gear. The latter stress vector undesirably causes the polishing rolls to vibrate in the direction perpendicular to the rotational axes of the rolls. If the driving force transmission is intermittently generated, the rotational speed of the polishing rolls varies intermittently, and the polishing rolls vibrate in the radial direction with the same period as that of the gear teeth.

Figure 4A:
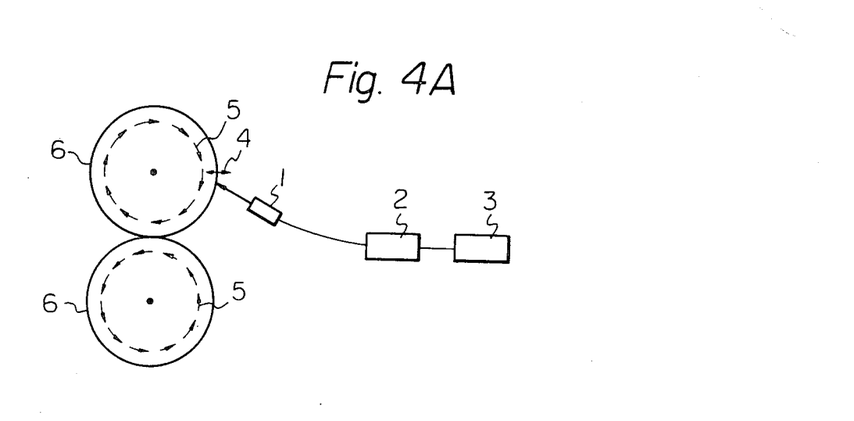
Figure 4B:
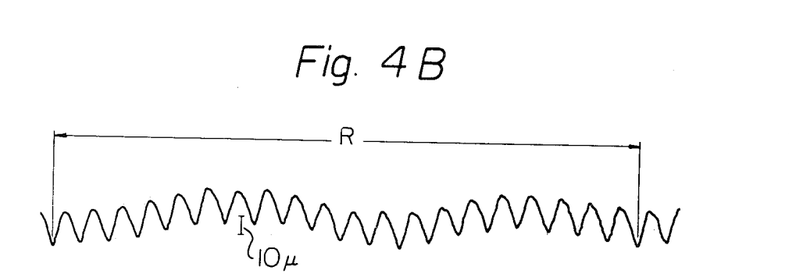
Figure 4C:
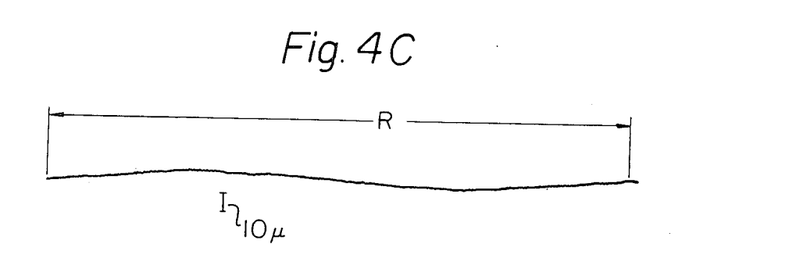

The apparatus for measuring the fluctuation of the polishing rolls is diagrammatically illustrated in FIG. 4A. This apparatus consists of an electro-micrometer 1, an amplifier 2 and a recorder 3. The electro-micrometer used was a K 301A type, supplied by Anritsu Electric K.K., Japan. In FIG. 4A, small arrows 4 and 5 express the vibration in the radial direction and the intermittent change in the rotational speed, respectively, of polishing rolls 6. Examples of the measurement results are illustrated in FIG. 4B and FIG. 4C. FIG. 4B illustrates the fluctuation of the polishing roll recorded during one revolution R of the polishing roll, which was driven by a transmission mechanism utilizing a conventional worm gear having relatively large worm clearances. The amplitude of fluctuation, i.e., the distance between the bottom and the top of each wave, illustrated in FIG. 4B, exceeds 15 microns. FIG. 4C illustrates the fluctuation of the polishing roll recorded during one revolution R of the polishing roll, which was driven by a continuous driving force transmission mechanism utilizing a flat belt. The amplitude of the fluctuation illustrated in FIG. 4C is approximately one to two microns (the small waves correspond to this fluctuation and the large waves are caused by the vibration-measuring apparatus.

It has been found that the amplitude of fluctuation of the polishing roll should preferably be about three microns or less, more preferably about two microns or less, for the intended optical surface smoothness. The optimum amplitude is about one micron or less.

The first requisite for producing the extruded sheet of the present invention is the employment of a continuous transmission mechanism for smoothly transmitting the driving force to the polishing rolls, as discussed above in detail. It has been found, however, that, in addition to the first requisite, the following three requisites should preferably be satisfied for the desired optical surface smoothness. That is, the second requisite is to control the temperature of the thermoplastic sheet so that, at the time the thermoplastic sheet leaves the polishing rolls, there is no adhesion of the thermoplastic sheet to the rolls and so that the thermoplastic sheet is not yet completely solidified. The third requisite is to suppress the fluctuation in the extrusion rate of the thermoplastic material within the range of $\pm 10\%$. The fourth requisite is to reduce the amplitude of the high frequency vibration of the extrusion sheeting apparatus caused by miscellaneous accessory machines so that it is below 15 microns. The second and other requisites will be explained in detail below.

The second requisite is important for preventing the formation of so-called sticking lines on the sheet surfaces, which lines extend perpendicularly to the extrusion direction. The sticking lines are liable to occur at the time the thermoplastic sheet leaves the polishing rolls, and thus causes optical distortion. In order to satisfy the second requisite, the surface of the final polishing roll should be maintained at a temperature equal to or below a temperature of 40° C. higher than the heat distortion temperature (hereinafter referred to as "HDT" for brevity) of the thermoplastic sheet, although the suitable temperature varies depending upon the particular thermoplastic sheet material and the extrusion temperature. The HDT used herein refers to the temperature measured according to ASTM D-648 at a fiber stress of 18.5 kgf/cm$^2$. Furthermore, not only the surface of the polishing roll, but also the inside portion of the thermoplastic sheet, should be maintained at a suitable temperature. This is because, when the temperature of the inside portion of the thermoplastic sheet is extremely higher than that of the roll surface, the thermoplastic sheet is not uniformly cooled upon its contact with the roll surface, and therefore, tends to be nonuniformly drawn or to be distorted. This results in the thermoplastic sheet having a type of optical distortion other than that mentioned above. Although it is difficult to directly measure the temperature of the inside portion of the sheet, the temperature of the sheet surface opposite to the surface in contact with the final roll can be used in place of the temperature of the inside portion of the sheet. Generally, the temperature of the sheet surface opposite to the surface in contact with the final roll should be maintained at a temperature equal to or below a temperature of 50° C. higher than the HDT of the thermoplastic sheet.

Thus, by satisfying the following formulae, the temperature of the thermoplastic sheet can be controlled so that, at the time the thermoplastic sheet leaves the polishing rolls, there is no adhesion of the thermoplastic sheet to the rolls and so that the thermoplastic sheet is not yet completely solidified.

$$Tr(°C.) \leq T_H + 50$$

$$T_3(°C.) \leq T_H + 40$$

where Tr is the temperature of the sheet surface opposite to the surface in contact with the final roll as measured immediately after the sheet leaves the final roll; $T_3$ is the temperature of the surface of the final roll; and $T_H$ is the HDT.

When a polishing roll assembly consisting of three rolls is used, it is preferably to satisfy the following formulae.

$$T_3(°C.) \leq Tr + 40$$

$$T_3(°C.) \leq T_2$$

where $T_2$ is the temperature of the surface of the second roll, and $T_3$ and Tr are the same as defined above.

It would be easy for a person skilled in the art to find optimum temperatures within the respective temperature ranges. It is preferable to control the temperature change so that it is within the range, of ±5° C., particularly ±3° C., of the intended temperature.

The third requisite is also crucial for obtaining the desired optical surface smoothness. Any fluctuation in the extrusion rate causes the extruded sheets to have optical distortions. Accordingly, any change of the extrusion rate should be controlled so that it is within the range of ±10% of the intended extrusion rate. For this purpose, it is particularly effective to use a quantitative feeding pump, to control the cylinder temperature and to use a die having a precisely determined structure.

The fourth requisite is also important for obtaining the desired optical surface smoothness. This is because the apparatus, particularly the parts thereof ranging from the extrusion die to the polishing rolls, is subjected to high frequency vibration due mainly to the driving motors for driving a main screw, polishing rolls, and cutters, or attachment devices such as a refrigerator and blowers placed somewhere in the plant. Such high frequency vibration causes an optical surface distortion to occur. Because of the dependency on the time factor or, in other words, on the frequency of the viscoelastic properties of the melt polymers, a high frequency vibration of the rolls causes only a lower degree of distortion than that caused by a low frequency fluctuation of the rolls. Therefore, the entire apparatus should be controlled so that the amplitude of the vibration is smaller than 15 microns as measured on the rest of the polishing rolls.

The rigid thermoplastic material may have incorporated therein additives such as a colorant, stabilizer, ultraviolet absorber or antistatic agent.

The invention will be further illustrated by the following examples.

EXAMPLE 1

Beads of a copolymer comprised of 5% by weight of methyl acrylate and 95% by weight of methyl methacrylate and having a molecular weight of approximately 150,000 and an HDT of 90° C. were melt-extruded through a single screw vented extruder (120 mm in diameter) provided with a T-die. The extrudate was cooled and surface-polished by using three polishing rolls each having a diameter of 300 mm to obtain an extruded sheet of 3 mm in thickness. A fluid contact type transmission system was employed for transmitting the driving force to the polishing rolls. Protective masking papers were caused to adhere to both surfaces of the extruded sheet.

The temperature of the copolymer material at the exit of the T-die was 250° C. The temperature ($T_3$) of the surface of the final polishing roll and the temperature (Tr) of the sheet surface opposite to the surface in contact with the final polishing roll, as measured immediately after the sheet had left the final polishing roll, were respectively set as shown in Table II, below. Any change of the extrusion rate with respect to time was controlled so as to fall within the range of 150 kg/hour±x% (x is shown in Table II, below). The amplitude of the high frequency vibration as measured with respect to the rest of the polishing rolls were controlled at y microns as shown in Table II, below.

For comparison purposes the above-mentioned procedure was repeated wherein a conventional gear transmission system was employed for transmitting the driving force to the polishing rolls, instead of the fluid contact type transmission system, with all other conditions remaining substantially the same.

The appearance of the extruded sheet and the degree of optical distortion thereof are shown in Table II, below. The appearance was evaluated as follows. An incident light from a 20 W fluorescent straight tube was reflected on one surface of the extruded sheet at an angle of 20 degrees, and the resultant parallel stripe pattern was observed with the naked eye. The observed appearance can be ranked in the four following ways:

A: Straight stripes.
B: Slightly distorted stripes.
C: Slightly waved stripes.
D: Prominently waved stripes.

TABLE II

| Type of transmission | No. | $T_3$ (°C.) | Tr (°C.) | x (%) | y (μ) | Result Appearance | Degree of optical distortion (δ) |
|---|---|---|---|---|---|---|---|
| Fluid contact | 1 | 93 | 100 | 5 | 5 | A | 0.03 |
| Fluid contact | 2 | 95 | 100 | 5 | 5 | A | 0.03 |
| Fluid contact | 3 | 98 | 105 | 5 | 15 | A | 0.04 |
| Fluid contact | 4 | 100 | 110 | 7 | 5 | A | 0.05 |
| Fluid contact | 5 | 110 | 120 | 10 | 20 | B | 0.07 |
| Gear | 6 | 95 | 100 | 5 | 5 | B | 0.08 |
| " | 7 | 95 | 100 | 5 | 20 | B | 0.09 |
| " | 8 | 98 | 105 | 5 | 20 | C | 0.12 |
| " | 9 | 100 | 110 | 7 | 20 | C | 0.15 |
| " | 10 | 120 | 127 | 11 | 20 | D | 0.18 |

EXAMPLE 2

Beads of polycarbonate having an HDT of 140° C. were melt-extruded through a single screw vented extruder (120 mm in diameter) provided with a T-die. The extrudate was cooled and surface-polished by using three polishing rolls each having a diameter of 300 mm driven by a fluid contact type transmission system. The extruded sheet so produced was 3.5 mm in thickness. The temperature of the polycarbonate at the exit of the T-die was 280° C. The temperature ($T_3$) of the surface of the final polishing roll and the temperature ($T_r$) of the sheet surface opposite to the surface in contact with the final polishing roll, as measured immediately after the sheet had left the final polishing roll, were set as shown in Table III, below. Any change of the extrusion rate with respect to time was controlled so as to fall within the range of 90 kg/hour ±x% (x is shown in Table III, below). The amplitude of the vibration as measured with respect to the rest of the polishing rolls was controlled at y microns as shown in Table III, below.

For comparison purposes, the above-mentioned procedure was repeated wherein a conventional silent chain transmission system instead of the fluid contact type transmission system was employed for transmitting the driving force to the polishing rolls, with all other conditions remaining substantially the same.

The appearance of the extruded sheets and the degree of optical distortion thereof are shown in Table III, below.

TABLE III

| Type of trans- mission | No. | $T_3$ (°C.) | $T_r$ (°C.) | x (%) | y (μ) | Result Appear- ance | Degree of optical distortion (δ) |
|---|---|---|---|---|---|---|---|
| Fluid contact | 1 | 150 | 160 | 7 | 5 | A | 0.04 |
| Fluid contact | 2 | 160 | 168 | 7 | 5 | A | 0.04 |
| Fluid contact | 3 | 165 | 175 | 7 | 15 | A | 0.05 |
| Fluid contact | 4 | 168 | 180 | 7 | 5 | A | 0.06 |
| Fluid contact | 5 | 170 | 188 | 10 | 20 | B | 0.08 |
| Silent chain | 1 | 150 | 160 | 7 | 5 | B | 0.08 |
| Silent chain | 2 | 150 | 160 | 20 | 15 | C | 0.10 |
| Silent chain | 3 | 160 | 170 | 7 | 20 | C | 0.12 |
| Silent chain | 4 | 160 | 178 | 7 | 20 | C | 0.14 |
| Silent chain | 5 | 170 | 190 | 7 | 5 | D | 0.18 |

EXAMPLE 3

Following approximately the same procedure as that mentioned in Example 1, extruded sheets were produced from beads of polystyrene having an HDT of 95° C. The temperature ($T_3$) of the surface of the final polishing roll, the temperature ($T_r$) of the sheet surface opposite to the surface in contact with the final polishing roll (as measured immediately after the sheet had left the final polishing roll), the change limit value (x) of the extrusion rate and the amplitude of the vibration (y), as measured with respect to the rest of the polishing rolls, were the same as those shown in Table IV, below.

The appearance of the extruded sheets and the degree of the optical distortion thereof are shown in Table IV, below.

TABLE IV

| Type of trans- mission | No. | $T_3$ (°C.) | $T_r$ (°C.) | x (%) | y (μ) | Result Appear- ance | Degree of optical distortion (δ) |
|---|---|---|---|---|---|---|---|
| Fluid contact | 1 | 95 | 100 | 5 | 5 | A | 0.04 |
| Fluid contact | 2 | 98 | 103 | 5 | 10 | A | 0.05 |
| Fluid contact | 3 | 110 | 120 | 13 | 22 | B | 0.07 |
| Gear | 1 | 95 | 100 | 5 | 5 | C | 0.09 |
| " | 2 | 98 | 104 | 5 | 13 | C | 0.10 |
| " | 3 | 110 | 122 | 18 | 25 | D | 0.19 |

EXAMPLE 4

Beads of a copolymer comprised of 6% by weight of methyl acrylate and 94% by weight of methyl methacrylate and having a molecular weight of approximately 170,000 and an HDT of 89° C. were melt-extruded through a single screw vented extruder (the screw diameter = 120 mm) provided with a T-die. The extrudate was cooled and surface-polished by using three polishing rolls each having a diameter of 300 mm. A flat belt type transmission system was employed for transmitting the driving force from a DC motor to the polishing rolls. The extruded sheet so produced was 2 mm in thickness. The temperature ($T_3$) of the surface of the final polishing roll, the temperature ($T_r$) of the sheet surface opposite to the surface in contact with the final polishing roll (as measured immediately after the sheet had left the final polishing roll, the change limit value (x) of the extrusion rate and the amplitude of the vibration (y), as measured with respect to the rest of the polishing rolls, were as shown in Table V, below. All other conditions remained substantially the same as those mentioned in EXAMPLE 1.

For comparison purposes, the above-mentioned procedure was repeated wherein a conventional gear transmission system was employed instead of the flat belt type transmission system, with all other conditions remaining substantially the same.

The appearance of the extruded sheets and the degree of optical distortion thereof are shown in Table V, below.

TABLE V

| Type of trans- mission | No. | Fluctua- tional amplitude of rolls (μ) | $T_3$ (°C.) | $T_r$ (°C.) | x (%) | Y (μ) | Result Appearance | Degree of optical distortion (δ) |
|---|---|---|---|---|---|---|---|---|
| Flat belt | 1 | 0-2 | 93 | 100 | 3 | 3 | A | 0.03 |
| Flat belt | 2 | 0-2 | 95 | 100 | 3 | 3 | A | 0.03 |
| Flat | 3 | 0-2 | 98 | 105 | 3 | 5 | A | 0.04 |

TABLE V-continued

| Type of transmission | No. | Fluctuational amplitude of rolls (μ) | $T_3$ (°C.) | Tr (°C.) | x (%) | Y (μ) | Result Appearance | Degree of optical distortion (δ) |
|---|---|---|---|---|---|---|---|---|
| Flat belt | 4 | 1-3 | 100 | 105 | 3 | 5 | A | 0.04 |
| Flat belt | 5 | 2-4 | 110 | 115 | 5 | 10 | A | 0.06 |
| Worm gear | 6 | 6-8* | 93 | 100 | 3 | 3 | B | 0.08 |
| Worm gear | 7 | 7-10* | 95 | 100 | 3 | 3 | C | 0.085 |
| Worm gear | 8 | 13-15 | 98 | 105 | 3 | 5 | C | 0.10 |
| Worm gear | 9 | 13-15 | 100 | 105 | 3 | 5 | C | 0.13 |
| Worm gear | 10 | 13-15 | 110 | 115 | 10 | 20 | D | 0.18 |

*1 A flexible coupling was provided between the transmission gear and the axes of the polishing rolls. Accordingly, the fluctuational amplitude of the polishing rolls in Run Nos. 6 and 7 was lower than that in Runs Nos. 8, 9 and 10.

What we claim is:

1. An extruded rigid thermoplastic sheet of a methyl methacrylate polymer which possesses a heat distortion temperature of at least 70° C., as measured according to ASTM-648, at a fiber stress of 18.5 kgf/cm², said thermoplastic sheet having optically smooth surfaces exhibiting a degree of optical distortion (δ) of from 0.03 to 0.06.

2. The extruded rigid thermoplastic sheet according to claim 1, wherein said sheet has a thickness of from 1 to 10 mm.

3. The extruded rigid thermoplastic sheet according to claim 1 or 2 which is produced by a process wherein a sheet-form extrudate from an extruder is polished by using polishing rolls driven via a continuous driving force transmission.

4. The extruded rigid thermoplastic sheet according to claim 1 or 2 which is produced by a process wherein a sheet-form extrudate from an extruder is polished by using polishing rolls driven via a continuous driving force transmission, while the temperature of the surfaces of the polishing rolls and the temperature of the extrudate are controlled so that, at the time the sheet leaves the polishing rolls, there is no adhesion of the sheet to the rolls and the sheet is not yet completely solidified.

* * * * *